United States Patent Office 3,600,193
Patented Aug. 17, 1971

3,600,193
FOOD COMPOSITIONS FOR PREPARING SNACK FOOD PRODUCTS
Elmer F. Glabe, Chicago, and Perry W. Anderson, Niles, Ill., assignors to Milk Research, Inc., Fond du Lac, Wis.
No Drawing. Filed Mar. 28, 1968, Ser. No. 717,014
Int. Cl. A23l 1/10
U.S. Cl. 99—83    11 Claims

ABSTRACT OF THE DISCLOSURE

Compositions for making snack food are prepared by dry blending corn flour, gelatinized corn flour, tapioca starch and milk solids (e.g., nonfat dry milk, whole milk solids, or buttermilk solids), with or without sodium chloride, starch phosphate, potato starch and flavoring materials, mixing with water to form a dough, shaping the dough to make snack preforms, steaming said preforms, drying the steamed preforms and cooking the resultant preforms. Snack foods made in accordance with the invention are puffed or expanded, porous and not dense, have a good flavor, and have a desirable texture for eating.

---

The present invention relates to food products and more particularly to the preparation of compositions that can be used in preparing snack foods and to the preparation of new and improved snack foods.

Many different types of snack foods are known. Some snack foods consist primarily of carbohydrates or carbohydrates and fats, for example, potato chips. Attempts have been made to prepare snack foods containing proteins. Thus, cheese has been added to snack foods and some attempts have been made to use powdered milk.

One of the objects of the present invention is to prepare a new and improved composition which is highly nutritious and contains proteins as well as carbohydrates.

Another object of the invention is to provide a new and improved snack food.

A further object of the invention is to provide a new and improved process for preparing snack food preforms which can be packaged and stored and later converted to a palatable food product.

Another object of the invention is to provide a new and improved process for preparing a new and distinctive type of snack food. Other objects will appear hereinafter.

In accordance with the invention compositions for making snack food are prepared by dry blending corn flour, gelatinized corn flour, and milk solids, i.e., nonfat dry milk, whole milk solids, and/or butter milk solids, with or without sodium chloride, starch phosphate, potato starch and/or flavoring materials, thereby producing a composition which can be packaged and stored and which is useful for conversion to a snack food. The aforesaid composition is converted to a snack food by mixing it with water to form a dough, shaping the dough to make snack preforms, steaming said preforms, drying the steamed preforms and cooking the resultant preforms. The snack preforms can be stored for further use, or they can be stored for further use after steaming and drying, the storage in either case preferably being effected under refrigeration or as a frozen food product.

The cooking of the preforms to produce a snack food can be carried out in several ways. For example, by frying in deep fat or vegetable oil, or by heating in hot air or by heating with microwaves. In any case, the cooking results in a puffing or expansion of the preform to produce a snack food which is porous and not dense, has a good flavor and has a desirable texture for eating.

While the invention is susceptible to some variation with respect to proportions, the following proportions of the various ingredients can be employed:

| Ingredients: | Parts by weight |
|---|---|
| Corn flour (preferably 20–35) | 50–5 |
| Gelatinized corn flour (preferably 15–25) (ratio of gelatinized corn flour to corn flour within the range of 1:49 to 49:1 by weight) | 9–29 |
| Tapioca starch (preferably 20–35) | 5–50 |
| Milk solids (preferably 10–20) | 1–30 |
| Sodium chloride | 0–5 |
| Starch phosphate | 0–10 |
| Flavoring material, namely, dried onion, rehydrated onion, bacon particles, cheese particles, potato flour, soy flour, peanut flour, sesame butter, peanut butter, peanuts, pecans, pecan butter, garlic butter, leek powder and artificial flavorings (preferably 1–15) | 0–15 |

As previously indicated, the foregoing ingredients can be dry blended and packaged in the form of a dry blend for future use or the composition, after dry blending, can be mixed with water in sufficient proportions to form a dough and the dough can be extruded or otherwise shaped to produce preforms of various shapes and sizes. These preforms can be packaged and stored as such for future use or they can be converted to a snack food by cooking them. However, before cooking, it is desirable to steam and dry the preforms. Steamed and dried preforms can also be stored as such, either in airtight containers or in a refrigerated or frozen state.

The amount of water required to produce a dough from the dry blend will vary somewhat depending upon the components of the composition but will usually be within the range of 25 to 40 parts by weight.

The cooking of the snack preforms is preferably carried out by deep fat frying. This results in a swelling or expansion of the preform. The amount of swelling or expansion will vary depending upon the amounts of various components in the composition. The use of larger amounts of tapioca starch makes the finished snack lighter and fluffier. If too much tapioca starch is used, the texture becomes too light. Starch phosphate also acts as an expanding agent. Too much starch phosphate, however, tends to produce a dense snack.

Corn flour is one of the essential ingredients of the composition and also one of the flavor forming materials. Part of the corn flour can be replaced by wheat flour but the latter does not contribute the desired taste. As the quantity of corn flour is increased with respect to the tapioca starch, the ability of the snacks to puff or expand during the frying stage is diminished.

The gelatinized corn flour is a texturizing agent which decreases the toughness and improves the palatability of the resultant snack. A typical gelatinized corn flour consists of corn endosperm which has been moistened and heated and dried on a hot roll. The starch in this flour is substantially gelatinized. In some cases there are a few ungelatinized granules and also granules which are only partially gelatinized. The gelatinized corn flour also increases the puffing ability and in this respect it is similar to tapioca flour. However, if the quantities of gelatinized corn flour are too large, the texture of the resultant snack is too fluffy.

The milk solids which can be in the form of nonfat dry milk, whole milk powder and/or butter milk solids, add to the flavor and provide a good nutritional balance. To some degree the milk solids control the amount of fat which the snacks will absorb while they are being fried. As the quantity of milk solids is increased, the amount of fat which is absorbed diminishes. An increase in the milk solids also improves the taste. The nutritional value increases due to an increase in protein content and a decrease in fat content.

The use of sodium chloride is optional but is preferable for the purpose of improving the taste of the finished snacks. The sodium chloride is also an important factor in the degree of gelatinization obtained in the tapioca and corn flours during the steam step. Increasing the sodium chloride content raises the temperature required for starch gelatinization. Hence, by introducing proper amounts of sodium chloride and controlling the quantities of tapioca flour and corn flour, a wide range of starch gelatinization can be obtained and controlled to provide in turn for the desired texture of the snack during frying.

The flavoring materials can be added to the dry blend or they can be added in the preparation of the dough. The quantity of these materials will naturally vary depending upon the taste desired and the particular flavoring material. Thus, the quantity of onion particles is preferably within the range of 1% to 5% by weight. Dried onions can be used or dehydrated onions can be partially rehydrated before putting them into the dough batch.

Potato flavors can be added preferably in the form of potato starch. Small quantities of commercial gelatinized potato flour or commercial dehydrated mashed potatoes can be used. The use of larger quantities of pregelatinized flour, such as potato flour, reduces the puffing of the snack during the frying step.

Starch phosphates, for example, ARD 1230 starch phosphate (American Maize) are available commercially and can be used to increase the puffing ability.

If potato starch is used to replace part of the tapioca starch, the amount of tapioca starch should be at least ¼ of the total amount of potato starch and tapioca starch. Where relatively large amounts of tapioca starch are used, the amount of corn flour can be reduced and the corn flour can consist mainly of gelatinized corn flour. The total amount of corn flour and tapioca starch in the dry blend is preferably within the range of 50% to 70% by weight. Optimum results are usually obtained by using approximately equal parts by weight of corn flour to tapioca starch. The weight ratio of tapioca starch to milk solids is usually within the range of 3:2 to 34:1.

The range of moisture content in the snack preforms before cooking is normally within the range of 6% to 12% by weight with the optimum being around 8% by weight. These preforms can be kept for a long time without refrigeration which makes it possible to package them for institutional use so that they can be cooked to provide fresh snacks as needed.

The shape of the preforms can be varied widely. One method of preparation is to force the dough through a die ring to produce a tubular preform which is then cut transversely into rings similar to onion rings but having a constant diameter. When these rings are cooked in hot vegetable oil or deep fat fried they become crinkled and resemble cooked onion rings. The dough can also be extruded as a sheet, the extruded sheet then being cut by a die to form chips similar to potato chips before frying. In most cases, the wall thickness of the rings or chips will be within the range of ⅛″ to ³⁄₃₂″. Another type of shape is one resembling popped corn except in smaller dimensions. When the extruded pieces in this shape are heated they expand to produce a snack resembling popped corn. It will be recognized that many other shapes can be provided by altering the extrusion dies.

The snack preforms usually contain about 25% to 35% by weight of water after steaming and if they are refrigerated or frozen they should be dried to 6% to 12% by weight moisture before cooking.

The steam step is carried out by subjecting the extruded dough pieces, spread on trays or a belt preferably made from fiber glass to prevent sticking, to steam at atmospheric pressure for varying lengths of time. The time of steaming depends in part on the capacity of the steamer to bring the dough pieces up to a temperature of 190° F. to 210° F. The rise in temperature of the dough pieces is influenced by the amount of water in the dough. Increasing the water has the effect of increasing the time required to raise the dough pieces to the desired temperature. On the other hand, a very low moisture content in the dough, although it permits rapid increase in temperature, does not provide enough water for the starch granules to swell or gelatinize to the desired point. The goal is partial gelatinization or swelling of the starch granules. This is accomplished by raising the temperature of the pieces from 190° F. to 210° F. In one model of a steamer, this requires 15 minutes.

The length of time of steaming, provided the optimum temperature of 190° F. to 210° F. is attained, is relatively less important. It is important to attain the proper temperature, but if the snacks are held at this temperature for even as long as five minutes longer, no harm is done. This assumes that the steamer does not permit condensed water to drop onto the snack pieces.

After the dough pieces are taken from the steamer, they are immediately transferred on the same racks or belt to a dryer. The most ideal conditions of the dryer are where the differential between dry bulb temperature and wet bulb temperature remains constant at 16° F. Dry bulb temperatures ranging from 100° F. to 150° F. may be employed. Lower temperatures will require somewhat longer time to bring the dough pieces to the required moisture content from 6.0% to 12.0%.

The drying process must be controlled so that the moisture transfer to the atmosphere of the dryer from the pieces is uniform. If the moisture loss occurs only from the outer surface of the snacks, and the inner portions of the snacks retain the moisture, then the total moisture of the snack pieces may be within the required ideal of 6.0% to 8.0%, but the snacks will not puff or expand during frying. The reason for this is that the starch granules in the outer portions of the preforms have little or no moisture with which to gelatinize during the frying step. If the drying operation is carried out at 150° F. and 134° F. wet bulb (relative humidity 64%), the snack pieces will be dried in 1.5 hours and the moisture distribution within the snack preforms will be proper.

If the process has been properly carried out and the relationship between quantity of milk, quantity of root starch, water in the dough, degree of gelatinization during steaming, reduction of moisture to the range of 6.0% to 12.0% in the proper amount of time, then these preforms will expand and pop upon being fried in oil at 390° F. to 400° F. The puffed pieces will have a texture bordering between light and fluffy to crispiness, but without high density or doughiness. They will also have good flavor.

The invention will be further illustrated but is not limited by the following examples in which the quantities are given in parts by weight unless otherwise indicated.

EXAMPLE I

A composition was prepared from the following:

| | Percent |
|---|---|
| Corn flour | 32.00 |
| Gelatinized corn flour | 19.00 |
| Tapioca flour | 34.00 |
| Milk solids (nonfat dry milk) | 10.00 |
| Sodium chloride | 5.00 |
| | 100.00 |

This formula was then used according to the process previously described. The steps involved were blending, mixing the dough, extruding the dough, steaming the extruded pieces, drying the extruded pieces.

These extruded pieces or preforms were then dropped into hot vegetable oil at 390° F. to 400° F. They swelled, rose to the surface, and in a few seconds were removed from the frying fat. They were then cooled and were ready to eat. Some flavoring materials may be added by sprinkling the flavoring materials onto the hot snacks immediately after they are removed from the frying fat. The flavoring materials adhere to the hot fat-coated surface of the snacks and are thereby absorbed and become an integral part of the snack. Flavoring materials may also be in the liquid or plastic form; when brought into contact with the hot fat-coated snacks, these liquid or plastic flavoring materials are absorbed into the snacks and become an integral portion of the snack.

In the formula of Example I given above, 1632 grams of the combined ingredients was mixed with 500 grams of tap water. This amounts to 30.8% of water based on the total dry weight of ingredients. The extruded dough pieces made therefrom have a total moisture content by analysis of 27.68%.

After steaming for 15 minutes at atmospheric pressure, the total moisture content of the dough pieces had risen to 29.97%. After drying, the dough pieces have a total moisture content of 9%.

The texture of the finished snack must be very porous and not dense. If the finished snack pieces are dense, it means that the puffing has not proceeded to the desired degree. The snack pieces, under these circumstances, are hard and do not have a desirable texture for eating. Texture, therefore, is, in addition to flavor, the most important characteristic of these snacks.

EXAMPLE II

Two different kinds of milk solids were used in making these snacks. Nonfat dry milk solids and/or dried buttermilk solids were employed. The composition for these two products was as follows:

|  | Nonfat dry milk, percent | Dried buttermilk solids, percent |
| --- | --- | --- |
| Moisture | 4.00 | 1.93 |
| Protein | 37.40 | 38.74 |
| Fat | 1.00 | 5.87 |
| Minerals | 8.40 | 7.68 |

Either of these two dried milk products worked equally well in the preparation of these snacks. The dried buttermilk solids contributed somewhat better flavor to the finished snacks.

In Example I dried buttermilk solids can be substituted for nonfat dry milk in the quantity indicated in that example.

EXAMPLE III

The following ingredients were used:

| | Percent |
| --- | --- |
| Corn flour | 41.00 |
| Gelatinized corn flour | 19.00 |
| Tapioca flour | 34.00 |
| Buttermilk solids | 1.00 |
| Sodium chloride | 5.00 |
| | 100.00 |

The dough was made with 31% of add water according to the processing conditions described in Example I. The result was a snack which puffed properly, had a good texture, and a good flavor, in which the particular milk flavor characteristic was just discernible.

EXAMPLE IV

The following ingredients were used:

| | Percent |
| --- | --- |
| Corn flour | 22.00 |
| Gelatinized corn flour | 19.00 |
| Tapioca flour | 34.00 |
| Buttermilk solids | 20.00 |
| Sodium chloride | 5.00 |
| | 100.00 |

The dough was made with 31.0% of added water. The processing was the same as in Example I. The resulting snacks were of good texture and had an excellent taste.

EXAMPLE V

The formula used in Example III was combined with 33% of added water. The processing was the same as in Example I. The resulting snacks, had a good texture somewhat superior to those produced by Example IV and had a superior flavor.

EXAMPLE VI

The following ingredients were used:

| | Percent |
| --- | --- |
| Corn flour | 12.00 |
| Gelatinized corn flour | 19.00 |
| Tapioca flour | 34.00 |
| Buttermilk solids | 30.00 |
| Sodium chloride | 5.00 |
| | 100.00 |

The dry ingredients of the formula were combined with 35% of added water. The dough was subjected to the same conditions as in Example I. The resulting snack pieces had a good flavor but the texture was somewhat dense. These snacks from Example VI did not puff as well as those produced by Examples IV and V.

As the nonfat dry milk content is increased in the dough batch, it has been found preferable to increase the amount of added water. Water content up to 40% has been found to be applicable when amounts of nonfat dry milk solids in the area of 10% to 30% are used.

It will be noted that when the nonfat dry milk solids are raised or lowered the formula is adjusted by raising or lowering the corn flour content. If wheat flour is being used in place of part of the corn flour, then the wheat flour is accordingly adjusted.

The quantity of root starch used in the formula is important to obtain the proper degree of puffing and thereby the proper texture. If high milk solids levels are employed, then the level of tapioca flour should also be kept raised as indicated in Examples III and VI. The following examples illustrate different levels of tapioca flour.

EXAMPLE VII

| | Percent |
| --- | --- |
| Corn flour | 42.00 |
| Gelatinized corn flour | 19.00 |
| Tapioca flour | 24.00 |
| Buttermilk solids | 10.00 |
| Sodium chloride | 5.00 |
| | 100.00 |

These dry ingredients were combined with 31.00% water. The dough was subjected to the processing conditions as described under Example I. The resulting snack pieces had a more dense texture than that exhibited by snacks from Examples III, IV and V.

EXAMPLE VIII

| | Percent |
| --- | --- |
| Corn flour | 22.00 |
| Gelatinized corn flour | 19.00 |
| Tapioca flour | 44.00 |
| Buttermilk solids | 10.00 |
| Sodium chloride | 5.00 |
| | 100.00 |

The dry ingredients of this dough were combined with 33.00% of added moisture. When this dough was subjected to conditions described under Example I, the resulting snacks had a texture which was very light and fluffy, although popping was good.

Since gelatinized corn flour does impart some flavor, the quantity usable is both limited as well as important. It should be pointed out that the raw corn flour is different from gelatinized corn flour in that the latter has more effect on flavor than the raw corn flour. As the gelatinized corn flour is raised or lowered, the raw corn flour is conversely raised or lowered. The following examples illustrate the use of different proportions of gelatinized corn flour.

EXAMPLE IX

|  | Percent |
|---|---|
| Corn flour | 42.00 |
| Gelatinized corn flour | 9.00 |
| Tapioca flour | 34.00 |
| Buttermilk solids | 10.00 |
| Sodium chloride | 5.00 |
|  | 100.00 |

These dry ingredients were combined with 31% of water. The dough was subjected to the processing conditions as described under Example I. The finished snack pieces had a slightly more dense texture and a taste slightly inferior to those produced by Example I.

EXAMPLE X

|  | Percent |
|---|---|
| Corn flour | 22.00 |
| Galatinized corn flour | 29.00 |
| Tapioca flour | 34.00 |
| Buttermilk solids | 10.00 |
| Sodium chloride | 5.00 |
|  | 100.00 |

The dry ingredients were combined with 34% of water. The dough was subjected to the processing conditions described under Example I. The resulting snack pieces had a good texture and a good flavor.

Starch phosphates appear to aid in puffing of the finished snack piece. Levels up to 10% have been found to be useful. The following examples illustrate different proportions.

EXAMPLE XI

|  | Percent |
|---|---|
| Corn flour | 28.00 |
| Gelatinized corn flour | 19.00 |
| Tapioca flour | 33.00 |
| Buttermilk solids | 10.00 |
| Sodium chloride | 5.00 |
| Starch phosphate (ARD 1230) | 5.00 |
|  | 100.00 |

These dry ingredients were combined with 34% of water. The dough was subjected to the processing conditions described under Example I. The resulting snack pieces had a light, fluffy texture somewhat more fluffy than those produced by the combination of Example I.

EXAMPLE XII

|  | Percent |
|---|---|
| Corn flour | 22.00 |
| Gelatinized corn flour | 19.00 |
| Tapioca flour | 34.00 |
| Buttermilk solids | 10.00 |
| Sodium chloride | 5.00 |
| Starch phosphate (ARD 1230) | 10.00 |
|  | 100.00 |

These dry ingredients were combined with 35% of water. The dough was subjected to the processing conditions described under Example I. The resulting snack pieces had a fluffy texture slightly more light than those produced by Example I.

The invention is hereby claimed as follows:

1. A composition for preparing food products consisting essentially of 5 to 50 parts by weight ungelatinized corn flour, 9 to 29 parts by weight of gelatinized corn flour, 5 to 50 parts by weight of a root starch from the class consisting of tapioca starch and potato starch of which at least one-fourth is tapioca starch, 1 to 30 parts by weight milk solids from the class consisting of nonfat dry milk solids, whole milk powder and buttermilk solids, 0 to 5 parts by weight of sodium chloride, 0 to 10 parts by weight of starch phosphate and 0 to 15 parts by weight of other flavoring material.

2. A composition as claimed in claim 1 in which said ungelatinized corn flour is 20 to 35 parts by weight, said gelatinized corn flour is 15 to 25 parts by weight, said root starch is 20 to 35 parts by weight, and said milk solids is 10 to 20 parts by weight.

3. A composition as claimed in claim 1 in which the weight ratio of gelatinized corn flour to corn flour is within the range of 1:49 to 49:1.

4. A composition as claimed in claim 1 in which corn flour is approximately 32% by weight, gelatinized corn flour is approximately 19% by weight, tapioca starch is approximately 34% by weight, nonfat dry milk solids is approximately 10% by weight and sodium chloride is approximately 5% by weight.

5. A composition as claimed in claim 1 in which corn flour is approximately 32% by weight, gelatinized corn flour is approximately 19% by weight, tapioca starch is approximately 34% by weight, dried buttermilk solids is approximately 10% by weight and sodium chloride is approximately 5% by weight.

6. A composition as claimed in claim 1 in which said ungelatinized corn flour is approximately 22% by weight, said gelatinized corn flour is approximately 19% by weight, said root starch is tapioca starch in the amount of approximately 34% by weight, said milk solids are buttermilk solids in the amount of approximately 20% by weight, and sodium chloride is approximately 5% by weight.

7. A shaped preform of a composition as claimed in claim 1 obtained by making a dough from said composition with water, shaping said dough, and drying said dough, said preform being adapted to be cooked to form a snack food.

8. A composition as claimed in claim 7 wherein said shaped dough has been steamed until the dough pieces attain a temperature of 190° F. to 210° F. and thereafter dried.

9. A process for making a snack food which comprises mixing a composition as claimed in claim 1 with water to form a dough, shaping said dough into preforms, drying said preforms to 6.0% to 12.0% moisture by weight, and cooking the resultant preforms.

10. A process as claimed in claim 9 in which said preforms are steamed before drying until they attain a temperature of 190° F. to 210° F.

11. A process as claimed in claim 9 in which said preforms are deep fat fried.

References Cited

UNITED STATES PATENTS

| 3,027,258 | 3/1962 | Markakis et al. | 99—81 |
| 3,282,701 | 11/1966 | Wong et al. | 99—1 |

RAYMOND N. JONES, Primary Examiner

U.S. Cl. X.R.

99—80, 81